United States Patent
Chen et al.

(10) Patent No.: US 9,641,069 B1
(45) Date of Patent: May 2, 2017

(54) CHARGE PUMP CIRCUIT

(71) Applicant: Solomon Systech (Shenzhen) Limited, Shenzhen, Guangdong (CN)

(72) Inventors: Zhirong Chen, Guangdong (CN); Wing Chun Chan, Hong Kong (HK); Wai Kwong Lee, Hong Kong (HK); Wai Sum Choi, Hong Kong (HK)

(73) Assignee: SOLOMON SYSTECH (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 15/135,581

(22) Filed: Apr. 22, 2016

(30) Foreign Application Priority Data

Apr. 18, 2016 (CN) .......................... 2016 1 0243415

(51) Int. Cl.
*H02M 3/07* (2006.01)
(52) U.S. Cl.
CPC ..................................... *H02M 3/07* (2013.01)
(58) Field of Classification Search
CPC ........... H02M 3/073; H02M 2003/075; H02M 2003/076
See application file for complete search history.

(56) References Cited

U.S. PATENT DOCUMENTS

| | | | | | |
|---|---|---|---|---|---|
| 6,130,574 | A | * | 10/2000 | Bloch | G11C 16/30 327/536 |
| 6,198,342 | B1 | * | 3/2001 | Kawai | H02M 3/073 327/534 |
| 6,888,400 | B2 | * | 5/2005 | Lin | H02M 3/073 327/536 |
| 7,215,179 | B2 | * | 5/2007 | Yamazoe | G11C 5/145 327/534 |
| 7,436,239 | B2 | * | 10/2008 | Masuko | H02M 3/073 327/536 |
| 7,706,159 | B2 | * | 4/2010 | Kim | H02M 3/073 327/537 |

* cited by examiner

Primary Examiner — Jeffrey Zweizig

(57) ABSTRACT

A charge pump circuit includes a plurality of stages. Each stage of the charge pump circuit includes: a first transistor, drain of the first transistor being output of the stage, source of the first transistor being input of the stage; a second transistor, gate of the second transistor being connected to source of the first transistor, drain of the second transistor being connected to drain of the first transistor, source of the second transistor being connected to gate of the first transistor, body of the second transistor being connected to body of the first transistor; and a third transistor, gate of the third transistor being connected to drain of the first transistor, drain of the third transistor being connected to source of the first transistor, source of the third transistor being connected to body of the first transistor and body of the third transistor.

10 Claims, 10 Drawing Sheets

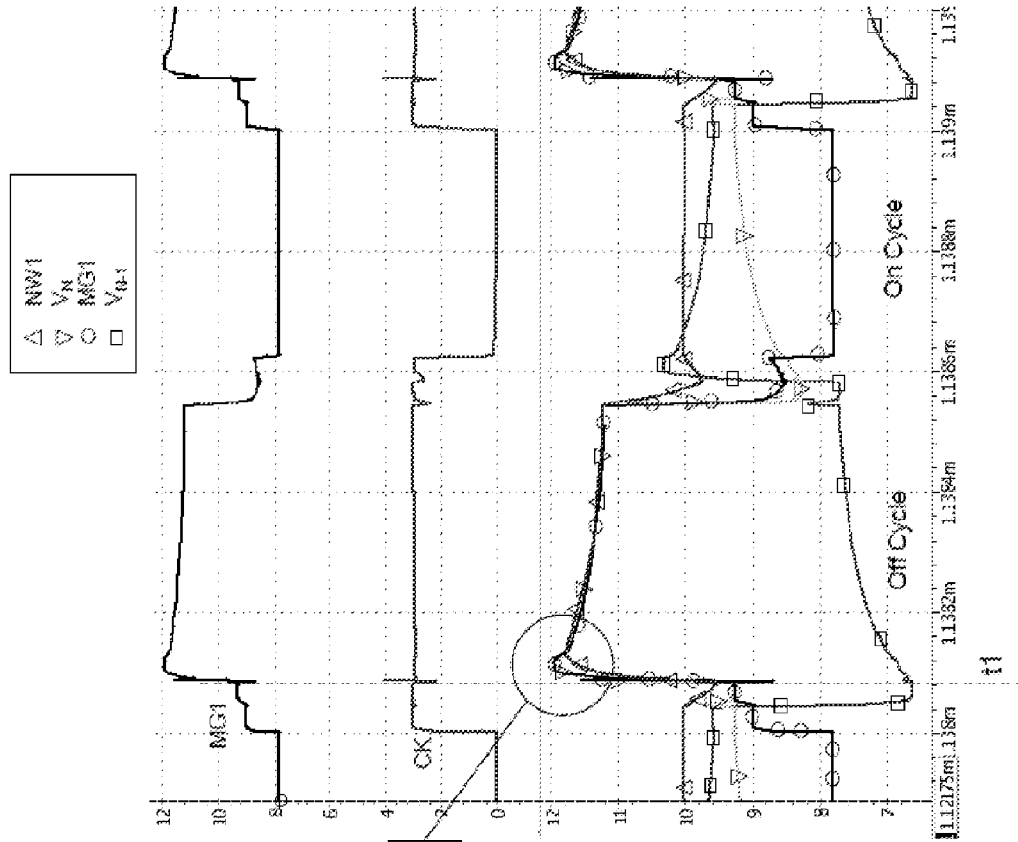
FIG. 1C (Prior Art)
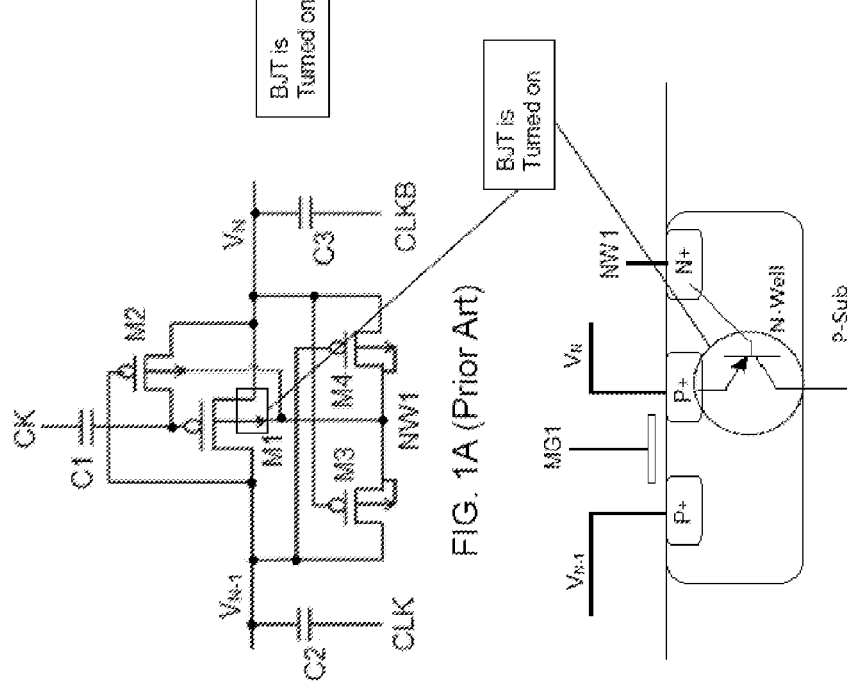
FIG. 1A (Prior Art)
FIG. 1B (Prior Art)

| Measured Parameters | Simulation Condition | | Simulation Results | |
|---|---|---|---|---|
| | | | Prior Art | This Invention 1 ( Improvement over Prior Art ) |
| Maximum Output Current, IOUT | VDD = 3V<br>C = 160pF<br>C1 = 0.3pF<br>C1B = 10pF | VOUT = 14.8V | 105.5uA | 128.6uA ( 22% ) |
| Power Efficiency | | VOUT = 15V<br>IOUT = 80uA | 32.6% | 44.2% ( 36% ) |

VDD : Input Voltage
VOUT : Output Voltage
IOUT : Output Current

FIG. 4

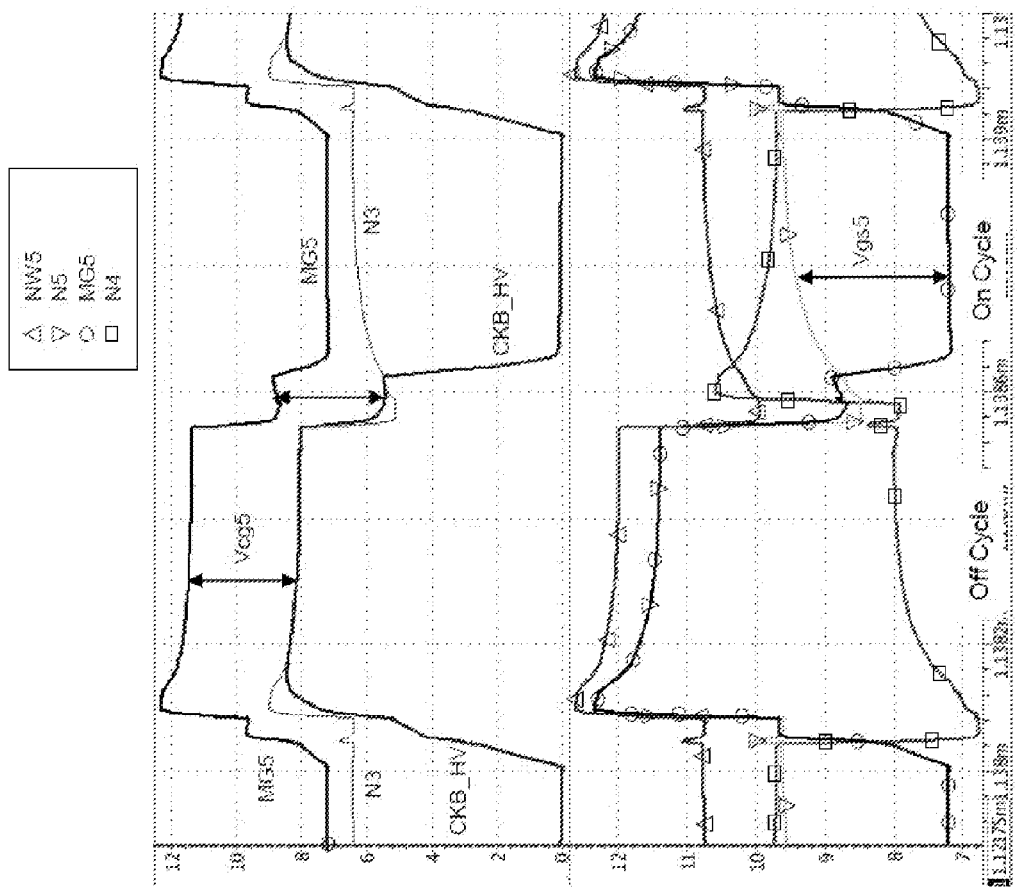
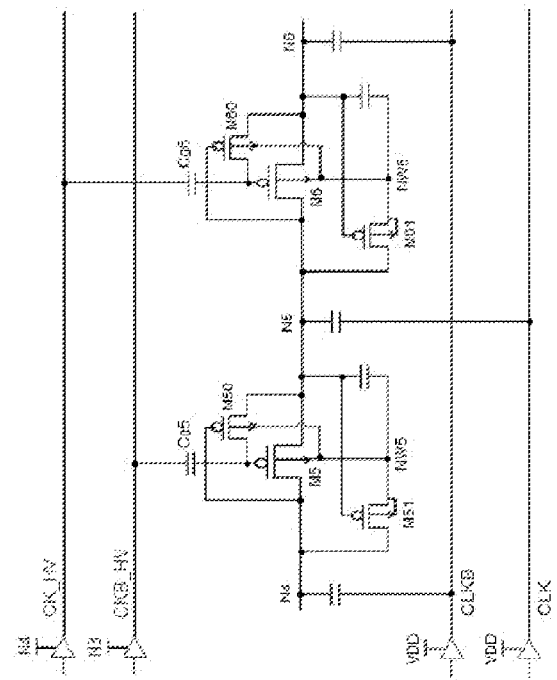
FIG. 6B
FIG. 6A

| Measured Parameters | Simulation Condition | | Simulation Results | | |
|---|---|---|---|---|---|
| | | | Prior Art | Invention 1 (Improvement over Prior Art) | Invention 1 + 2 (Improvement over Prior Art) |
| Maximum Output Current, IOUT | VDD = 3V C = 100pF C1 = 0.3pF | VOUT = 14.9V | 105.5uA | 128.6uA (22%) | 175.1uA (66%) (36% over invention 1 only) |
| Power Efficiency | | VOUT = 15V IOUT = 80uA | 32.6% | 44.2% (36%) | 42.8% (31%) |
| VDD : Input Voltage VOUT : Output Voltage IOUT : Output Current | | | | | |

FIG. 7

CHARGE PUMP CIRCUIT

CROSS-REFERENCE TO RELATED APPLICATIONS

The present application claims the benefit of Chinese Patent Application No. 201610243415.0 filed on Apr. 18, 2016; the contents of which are hereby incorporated by reference.

FIELD OF THE PATENT APPLICATION

The present patent application generally relates to electronic circuits and more specifically to a charge pump circuit.

BACKGROUND

FIG. 1A is the schematic circuit diagram of a stage of a conventional Dickson charge pump circuit. FIG. 1B is a cross-sectional view of a transistor M1 of the circuit depicted in FIG. 1A. FIG. 1C is a timing diagram of the circuit depicted in FIG. 1A. FIG. 1D is a schematic circuit diagram of the conventional Dickson charge pump with 8 stages implementation as depicted in FIG. 1A. Referring to FIGS. 1A, 1B, 1C and 1D, MOS transistors M3 and M4 are used to bias the body of transfer MOS M1. MG1 is the voltage level at the gate terminal of MOS device M1. CK is the clock to drive MG1 by capacitor C1. When CK is high, MG1 will be driven to higher voltage level, M1 will be turned off, and this time period is referred to as "Off Cycle". When CK is low, MG1 will be driven to a lower voltage level, M1 will be turned on, and this time period is referred to as "On Cycle".

The on-resistance Ron of transistors M3 and M4 is large, the body of M1 cannot properly follow the voltage toggling on source and drain of M1. In other words, the voltage change at source and drain of M1 will drive the voltage change at the body of M1. However, the voltage change response at the body of M1 is slow.

At the beginning of the "Off cycle" time t1, when $V_N$ voltage is pumped up in a short time, the body of M1 (NW1) cannot follow the voltage of $V_N$. Before time t1, the voltage of $V_N$ is lower than the voltage of the body of M1. Starting from time t1, the voltage of $V_N$ is higher than the voltage of the body of M1 (i.e. $V_N > V_{NW1}$) thus the parasitic BJT on source side of M1 is turned on, leading to leakage current flowing from $V_N$ to the substrate (P-sub), which is connected to ground. This leakage current reduces efficiency of the circuit.

SUMMARY

The present patent application is directed to a charge pump circuit. In one aspect, the charge pump circuit includes a plurality of stages. Each stage of the charge pump circuit includes: a first transistor, one of source and drain of the first transistor being output of the stage, the other one of source and drain of the first transistor being input of the stage; a second transistor, gate of the second transistor being connected to source of the first transistor, one of source and drain of the second transistor being connected to drain of the first transistor, the other one of source and drain of the second transistor being connected to gate of the first transistor, body of the second transistor being connected to body of the first transistor; a third transistor, gate of the third transistor being connected to drain of the first transistor, one of source and drain of the third transistor being connected to source of the first transistor, the other one of source and drain of the third transistor being connected to body of the first transistor and body of the third transistor; a first capacitor connecting a first clock to gate of the first transistor; a second capacitor connecting a second clock to source of the first transistor; a third capacitor connecting a third clock to drain of the first transistor; and a fourth capacitor connecting body of the first transistor to drain of the first transistor. The first clock is driven by the output of a predetermined stage. The second clock and the third clock are respectively driven by a same system supply voltage. The output of the predetermined stage is greater than the system supply voltage.

The first, second and third transistors may be PMOS transistors. The first, second and third transistors may be NMOS transistors. The fourth capacitor may have a capacitance over 5 times of parasitic capacitance on body of the first transistor.

The first clocks of odd stages may be driven by the output of one odd stage, while the first clocks of even stages may be driven by the output of one even stage.

In another aspect, the present patent application provides a charge pump circuit including a plurality of stages. Each stage of the charge pump circuit includes: a first transistor, one of source and drain of the first transistor being output of the stage, the other one of source and drain of the first transistor being input of the stage; a second transistor, gate of the second transistor being connected to source of the first transistor, one of source and drain of the second transistor being connected to drain of the first transistor, the other one of source and drain of the second transistor being connected to gate of the first transistor, body of the second transistor being connected to body of the first transistor; a third transistor, gate of the third transistor being connected to drain of the first transistor, one of the source and drain of the third transistor being connected to source of the first transistor, the other one of source and drain of the third transistor being connected to body of the first transistor and body of the third transistor; a first capacitor connecting a first clock to gate of the first transistor; a second capacitor connecting a second clock to source of the first transistor; a third capacitor connecting a third clock to drain of the first transistor; and a fourth capacitor connecting body of the first transistor to drain of the first transistor.

The second clock and the third clock may be respectively driven by a same system supply voltage. The first, second and third clocks may be respectively driven by a same system supply voltage. The first, second and third transistors may be PMOS transistors. The first, second and third transistors are NMOS transistors. The fourth capacitor may have a capacitance over 10 times of parasitic capacitance on body of the first transistor.

The first clocks of odd stages may be driven by the output of one odd stage, while the first clocks of even stages may be driven by the output of one even stage. The first clocks of odd stages may be driven by the output of one even stage, while the first clocks of even stages may be driven by the output of one odd stage.

In yet another aspect, the present patent application provides a charge pump circuit including a plurality of stages. Each stage of the charge pump circuit includes: a first transistor, drain of the first transistor being output of the stage, source of the first transistor being input of the stage; a second transistor, gate of the second transistor being connected to source of the first transistor, drain of the second transistor being connected to drain of the first transistor, source of the second transistor being connected to gate of the first transistor, body of the second transistor being connected to body of the first transistor; and a third transistor, gate of the third transistor being connected to drain of the first transistor, drain of the third transistor being connected to source of the first transistor, source of the third transistor being connected to body of the first transistor and body of the third transistor. Gate of the first transistor is driven by a first clock through a first capacitor. Source of the first transistor is driven by a second clock through a second capacitor. Drain of the first transistor is driven by a third clock through a third capacitor. Body of the first transistor is connected to drain of the first transistor through a fourth capacitor.

The first clock may be driven by the output of a predetermined stage. The first clocks of odd stages may be driven by the output of one stage, while the first clocks of even stages may be driven by the output of a stage next to that stage. The second clock and the third clock may be respectively driven by a same system supply voltage. The output of the predetermined stage may be greater than the system supply voltage.

The first, second and third clocks may be respectively driven by a same system supply voltage. The fourth capacitor may have a capacitance over 10 times of parasitic capacitance on body of the first transistor.

BRIEF DESCRIPTIONS OF THE DRAWINGS

FIG. 1A is a schematic circuit diagram of a stage of a conventional Dickson charge pump circuit.

FIG. 1B is a cross-sectional view of a transistor M1 of the circuit depicted in FIG. 1A.

FIG. 1C is a timing diagram of the circuit depicted in FIG. 1A.

FIG. 4 shows simulation results of the charge pump circuit as depicted in FIG. 3.

FIG. 6A is a schematic circuit diagram of two stages of a charge pump circuit in accordance with another embodiment of the present patent application.

FIG. 6B is a timing diagram of the circuit depicted in FIG. 6A.

FIG. 7 shows simulation results of the charge pump circuit depicted in FIG. 6A.

DETAILED DESCRIPTION

Reference will now be made in detail to a preferred embodiment of the charge pump circuit disclosed in the present patent application, examples of which are also provided in the following description. Exemplary embodiments of the charge pump circuit disclosed in the present patent application are described in detail, although it will be apparent to those skilled in the relevant art that some features that are not particularly important to an understanding of the charge pump circuit may not be shown for the sake of clarity.

Furthermore, it should be understood that the charge pump circuit disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 2B:
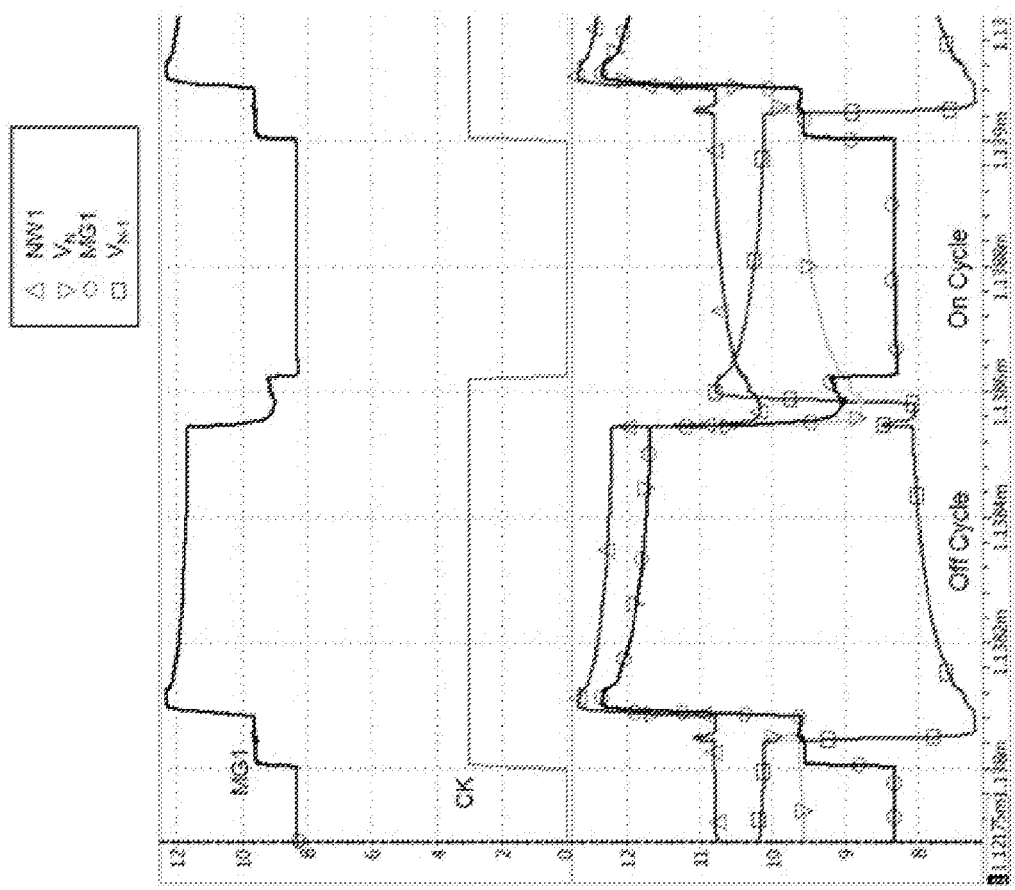
FIG. 2B is a timing diagram of the circuit depicted in FIG. 2A.
Figure 2A:
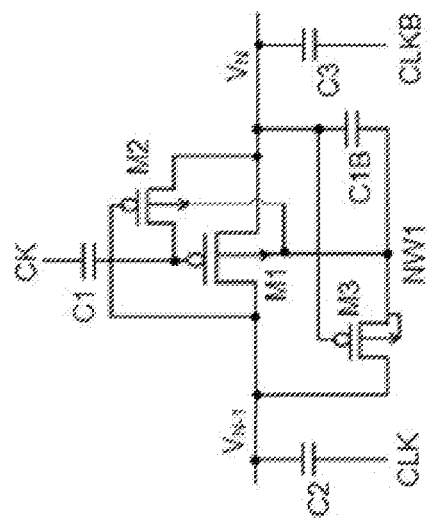
FIG. 2A is a schematic circuit diagram of a stage of a charge pump circuit in accordance with an embodiment of the present patent application.

FIG. 2A is a schematic circuit diagram of a stage of a charge pump circuit in accordance with an embodiment of the present patent application. FIG. 2B is a timing diagram of the circuit depicted in FIG. 2A. Referring to FIGS. 2A and 2B, a charge pump circuit includes a plurality of stages. Each stage of the charge pump circuit includes: a first transistor M1, drain of the first transistor M1 being output of the stage, source of the first transistor M1 being input of the stage; a second transistor M2, gate of the second transistor M2 being connected to source of the first transistor M1, drain of the second transistor M2 being connected to drain of the first transistor M1, source of the second transistor M2 being connected to gate of the first transistor M1, body of the second transistor M2 being connected to body of the first transistor M1; a third transistor M3, gate of the third transistor being connected to drain of the first transistor M1, drain of the third transistor M3 being connected to source of the first transistor M1, source of the third transistor M3 being connected to body of the first transistor M1 and body of the third transistor M3; a first capacitor C1 connecting a first clock CK to gate of the first transistor M1; a second capacitor C2 connecting a second clock CLK to source of the first transistor M1; a third capacitor C3 connecting a third clock CLKB to drain of the first transistor M1; and a fourth capacitor C1B connecting body of the first transistor M1 to drain of the first transistor M1.

Figure 1D:
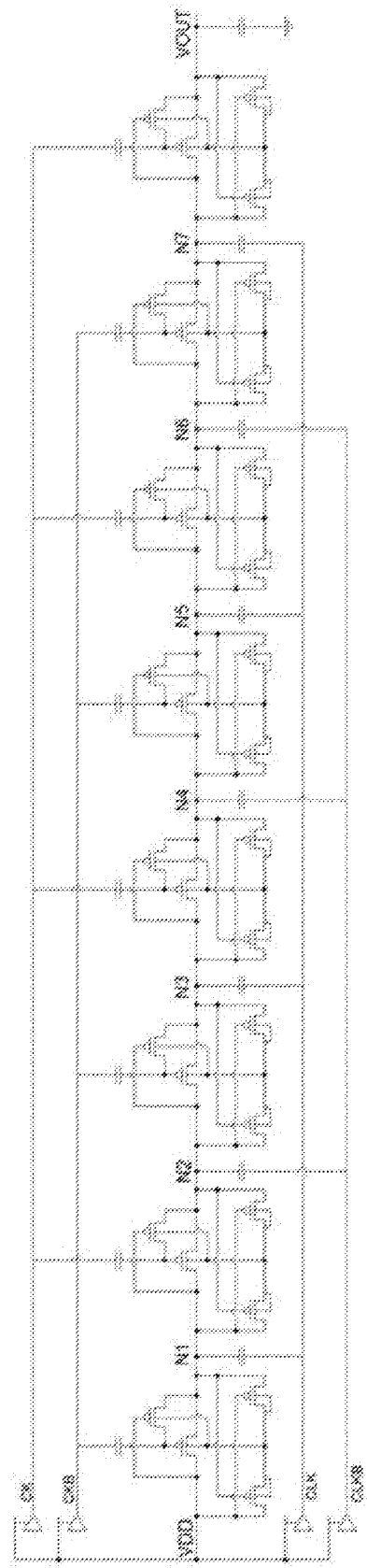
FIG. 1D is a schematic circuit diagram of the conventional Dickson charge pump with 8 stages implementation as depicted in FIG. 1A.
Figure 3:
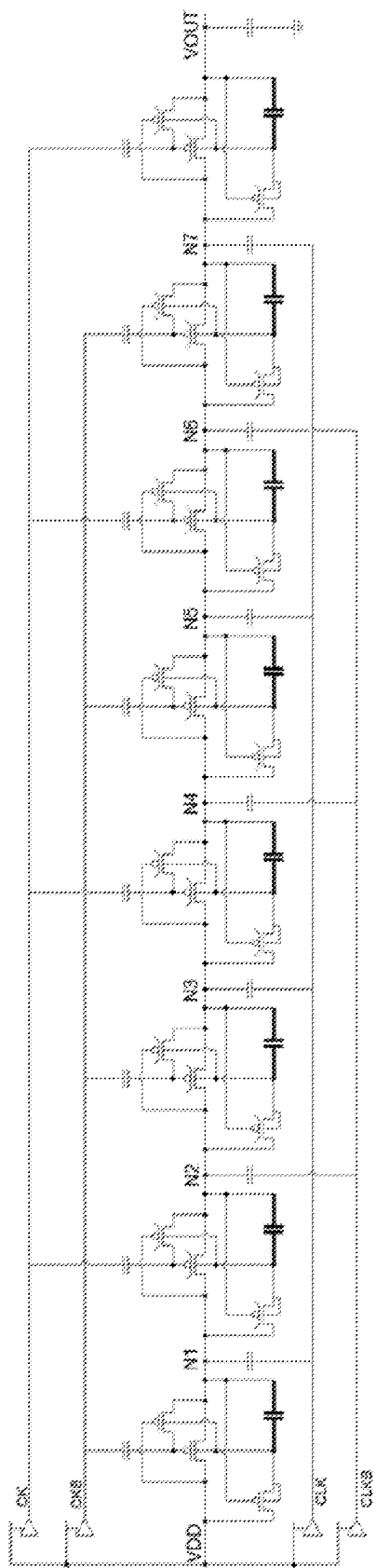
FIG. 3 shows a charge pump circuit that includes 8 stages of the circuit depicted in FIG. 2A.

In this embodiment, the capacitor C1B is used to replace the transistor M4 in FIG. 1A. The capacitor C1B can drive the body of the transistor M1 (NW1). Since the capacitance C1B is relatively much larger than other parasitic capacitance on the body NW1, the voltage response of the body NW1 to voltage change of $V_N$ is fast. The voltage of $V_N$ keeps being lower than the voltage of the body of M1, after time t1. The BJT remains off, and thus there is no leakage current. FIG. 3 shows a charge pump circuit that includes 8 stages of the circuit depicted in FIG. 2A. FIG. 4 shows simulation results of the charge pump circuit as depicted in FIG. 3. Referring to FIG. 4, the charge pump circuit in this embodiment can increase the power efficiency by 36%, and the maximum output current can increase by 22%.

In this embodiment, the capacitance of C1B depends on the parasitic capacitance on the body of the transistor M1, which is related to the size of the transistor M1. The capacitance of C1B should preferably be over 10 times of the parasitic capacitance on the body of the transistor M1, as long as the space allows, and it has to be at least 5 times.

If the capacitance of C1B is too big, the parasitic capacitance on C1B will degrade the efficiency of the charge pump. If the capacitance of C1B is too small, the response of the body voltage of M1 to $V_N$ will be slow.

Figure 5B:
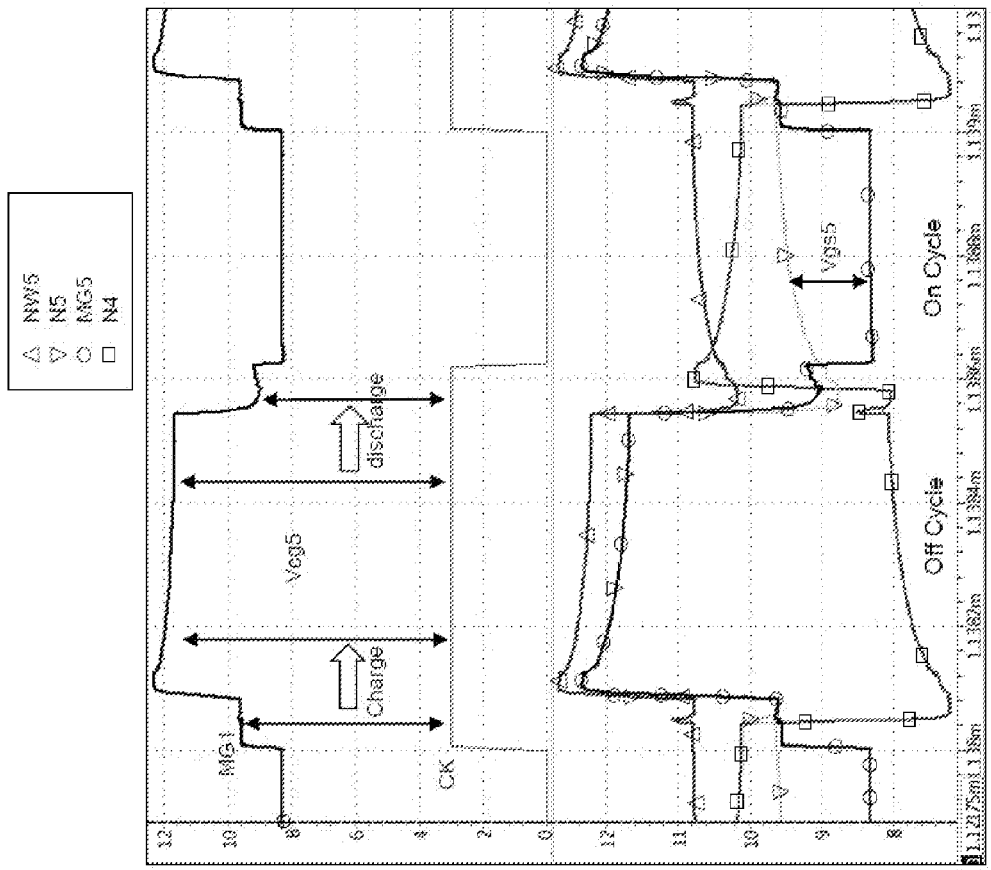
FIG. 5B is a timing diagram of the circuit depicted in FIG. 5A.
Figure 5A:
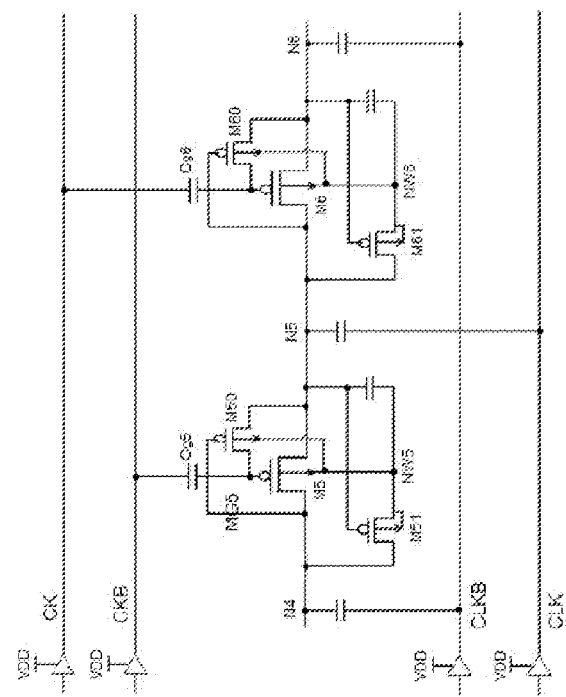
FIG. 5A is a schematic circuit diagram of two stages of a charge pump circuit in accordance with an embodiment of the present patent application.

FIG. 5A is a schematic circuit diagram of two stages of a charge pump circuit in accordance with an embodiment of the present patent application. FIG. 5B is a timing diagram of the circuit depicted in FIG. 5A. Referring to FIGS. 5A and 5B, in this embodiment, the voltage CKB has a voltage swing with an amplitude equal to VDD voltage, which is a system supply voltage. The Gate-Source voltage of the transistor M5 (Vgs5) is driven by coupling CKB via a capacitor Cg5. Thus the Vgs5 voltage swing is also small, and will not exceed VDD. The small Vgs5 to turn on M5, leading to a large on-resistance (Ron) of this transfer MOS M5. So, there is power loss on the large resistance and reduced output power and efficiency.

During the Off cycle, one terminal of capacitor Cg5 is constant at VDD voltage level. Another terminal MG5 is the gate of M5 which is driven by N5 through M50, toggling within the Off cycle. Thus the capacitor Cg5 is being charged and discharged, which consumes power.

FIG. 6A is a schematic circuit diagram of two stages of a charge pump circuit in accordance with another embodiment of the present patent application. FIG. 6B is a timing diagram of the circuit depicted in FIG. 6A. This embodiment uses dynamic output of intermediate stages for power supplies of the gate-driving circuits. The power supplies of the gate driving circuits of different stage may be different, and be optimized individually. In this embodiment, referring to FIGS. 6A and 6B, three different power supplies are used: VDD, output of stage 3 (N3) and output of stage 4 (N4). The gate driving circuits of stage 1 and stage 8 are powered by VDD. The gate driving circuits of stage 2, stage 4 and stage 6 are powered by N4. The gate driving circuits of stage 3, stage 5 and stage 7 are powered by N3. In other words, in this embodiment, the first clocks (i.e. CKB_HV) of odd stages (for instance stage 3, stage 5, and stage 7) are driven by the output of one odd stage (for instance N3), while the first clocks (i.e. CK_HV) of even stages (for instance, stage 2, stage 4 and stage 6) are driven by the output of one even stage (for instance, N4).

Referring to FIGS. 6A and 6B, the stage 5's output is N5, the transfer MOS is M5, the gate-driving clock is CKB_HV. The turn-on voltage of the gate of M5 is increased. CKB_HV is employed to drive the gate terminal of M5 through capacitor Cg5.

The power supply of CKB_HV driving circuit is N3, which has higher voltage than VDD. So Gate-Source voltage of M5 (Vgs5) is increased compared with the conventional circuit, leading to small on-resistance (Ron) of this transfer MOS M5. Thus the power loss on this smaller resistance is reduced, and the output power and the efficiency are increased.

In this embodiment, one terminal of the capacitor Cg5 is driven by N5. Another terminal of the capacitor Cg5 is driven by CKB_HV, which is powered by N3. N3 has the same waveform as N5 except a DC difference. The voltage between N3 and N5 is near to a constant. The voltage across the two terminals of Cg5 is almost constant. Therefore, the power loss for charging and discharging Cg5 is largely reduced.

In this embodiment, the gate driving circuits are powered by higher voltage. So, they consume more power. Therefore the advantage of this embodiment is higher output current or power, instead of improving efficiency. FIG. 7 shows simulation results of the charge pump circuit depicted in FIG. 6A.

In this embodiment, the output of the last stage is static VOUT, while outputs of other stages are toggling. The reduced power loss on the capacitor Cg5 analysis is not applicable for the last stage. A static DC power of the gate driving circuit for the last stage helps reducing capacitor power loss while a toggling power increase such capacitor power loss.

In this embodiment, the power of the gate driving circuit of the last stage is VDD. This helps reducing capacitor power loss but in the meanwhile the circuit does not have the advantage of higher gate turn-on voltage and lower on-resistance of the transfer MOS.

In this embodiment, the higher the gate voltage, the lower the on-resistance (Ron) will be, or a smaller MOS transistor is required for the same on-resistance. The lower the on-resistance, the higher the output power can be delivered.

To increase the output power, the output of higher-voltage stages can be selected to power the clock buffers, but the power loss will become higher and the power efficiency will become lower. To improve the power efficiency, the output of lower-voltage stages can be selected to power the clock buffers.

In this embodiment, power output of the charge pump circuit is increased, or the device size and the cost to have the same power output are reduced.

Figure 8:
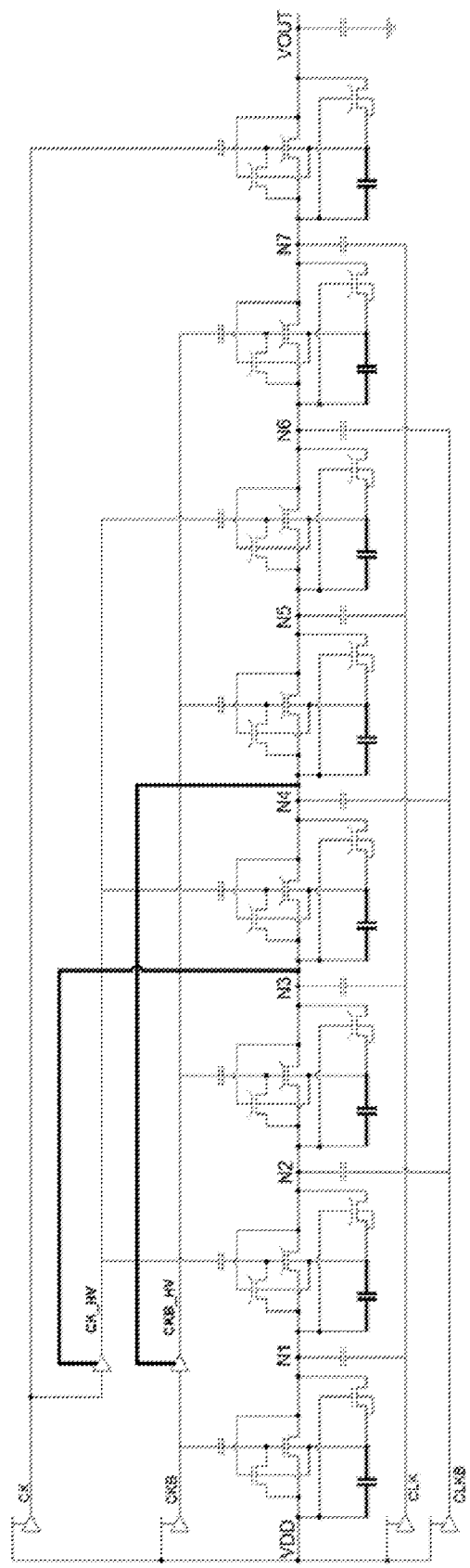
FIG. 8 is a schematic circuit diagram of a charge pump circuit in accordance with another embodiment of the present patent application.
Figure 9:
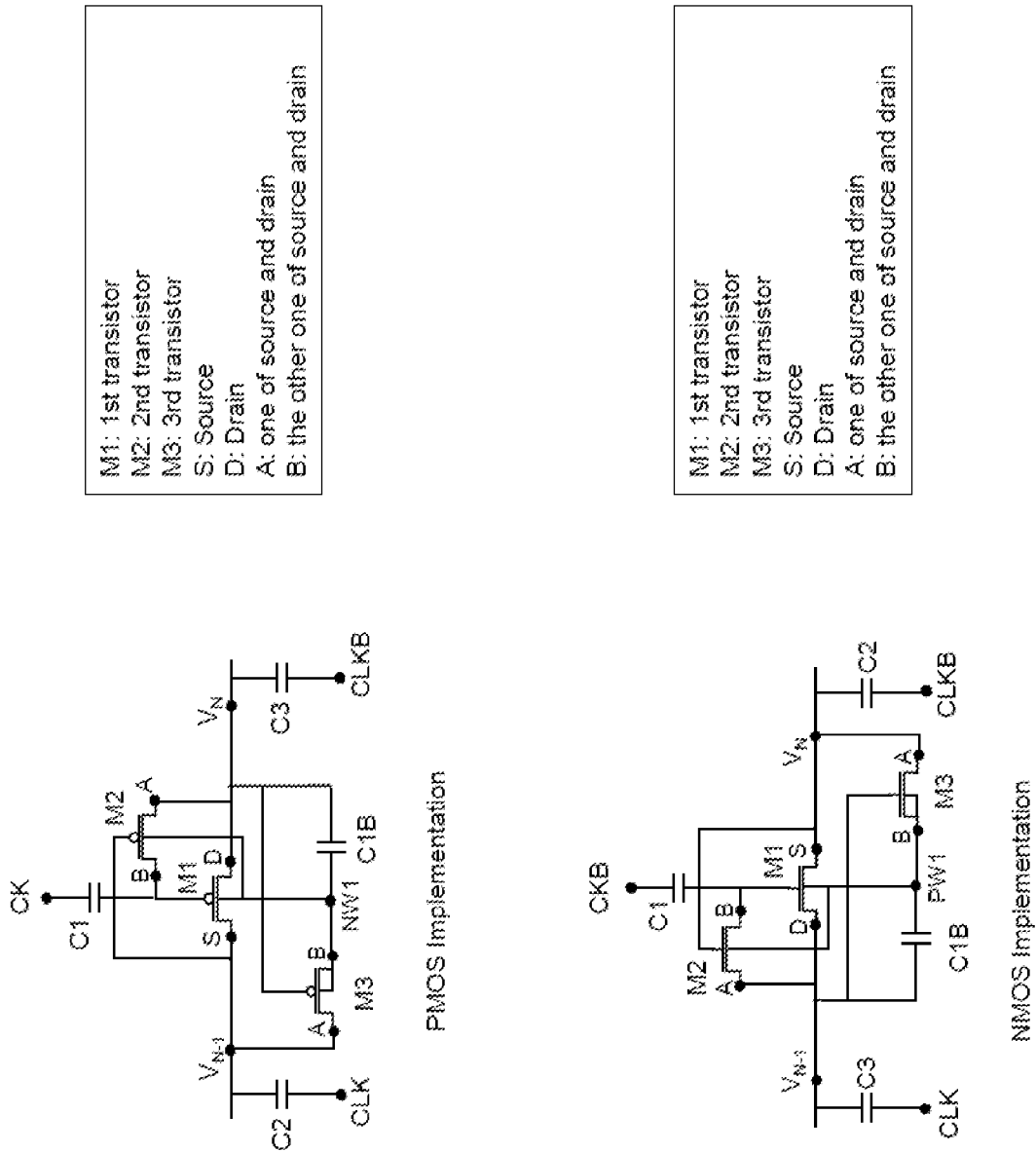
FIG. 9 illustrates a schematic circuit diagram of a stage of the charge pump circuit depicted in FIG. 3 in comparison with that of a stage of the charge pump circuit depicted in FIG. 8.

FIG. 8 is a schematic circuit diagram of a charge pump circuit in accordance with another embodiment of the present patent application. In this embodiment, all transistors are NMOS transistors. It is understood that although there are eight stages in the charge pump circuit depicted in FIG. 8, the number of stages for the charge pump circuit may be different from eight in this embodiment as well as in other above-mentioned embodiments. FIG. 9 illustrates a schematic circuit diagram of a stage of the charge pump circuit depicted in FIG. 3 (PMOS implementation) in comparison with that of a stage of the charge pump circuit depicted in FIG. 8 (NMOS implementation).

Referring to FIG. 8, in this embodiment, three different power supplies are used: VDD, output of stage 3 (N3) and output of stage 4 (N4). The gate driving circuits of stage 1 and stage 8 are powered by VDD. The gate driving circuits of stage 2, stage 4 and stage 6 are powered by N3. The gate driving circuits of stage 3, stage 5 and stage 7 are powered by N4. In other words, in this embodiment, the first clocks (i.e. CKB_HV) of odd stages (for instance stage 3, stage 5, and stage 7) are driven by the output of one even stage (for instance N4), while the first clocks (i.e. CK_HV) of even stages (for instance, stage 2, stage 4 and stage 6) are driven by the output of one odd stage (for instance, N3).

While the present patent application has been shown and described with particular references to a number of embodiments thereof, it should be noted that various other changes or modifications may be made without departing from the scope of the present invention.

What is claimed is:

1. A charge pump circuit comprising a plurality of stages, each stage of the charge pump circuit comprising:
   a first transistor, one of source and drain of the first transistor being output of the stage, the other one of source and drain of the first transistor being input of the stage;
   a second transistor, gate of the second transistor being connected to source of the first transistor, one of source and drain of the second transistor being connected to drain of the first transistor, the other one of source and drain of the second transistor being connected to gate of the first transistor, body of the second transistor being connected to body of the first transistor;

a third transistor, gate of the third transistor being connected to drain of the first transistor, one of the source and drain of the third transistor being connected to source of the first transistor, the other one of source and drain of the third transistor being connected to body of the first transistor and body of the third transistor;

a first capacitor having a first end connecting to gate of the first transistor and a second end being a driving end of the stage;

a second capacitor connecting the output of the stage to a predetermined signal end; and a third capacitor connecting body of the first transistor to drain of the first transistor;

wherein the plurality of stages comprises a first stage, a plurality of intermediate stages and a last stage;

the driving end of each odd stage of the plurality of intermediate stages is driven by the output of a predetermined stage; and the driving end of each even stage of the plurality of intermediate stages is driven by the output of a stage next to the predetermined stage.

2. The charge pump circuit of claim 1, wherein the predetermined stage and the stage next to the predetermined stage are both from the plurality of intermediate stages.

3. The charge pump circuit of claim 1, wherein the first, second and third transistors are PMOS transistors.

4. The charge pump circuit of claim 1, wherein the first, second and third transistors are NMOS transistors.

5. The charge pump circuit of claim 1, wherein the third capacitor has a capacitance over 10 times of parasitic capacitance on body of the first transistor.

6. The charge pump circuit of claim 1, wherein the predetermined stage is an odd stage, and the stage next to the predetermined stage is an even stage.

7. The charge pump circuit of claim 1, wherein the predetermined stage is an even stage, and the stage next to the predetermined stage is an odd stage.

8. The charge pump circuit of claim 1, wherein the predetermined signal end connecting to the second capacitor of each of the first stage and odd stages of the plurality of intermediate stages connects to a first clock, the predetermined signal end connecting to the second capacitor of each of even stages of the plurality of intermediate stages connects to a second clock, and the predetermined signal end connecting to the second capacitor of the last stage connects to a ground.

9. The charge pump circuit of claim 8, wherein the first clock and the second clock are respectively driven by a same system supply voltage.

10. The charge pump circuit of claim 9, wherein the output of the predetermined stage and the output of the stage next to the predetermined stage are both greater than the system supply voltage.

* * * * *